United States Patent
Gorelik et al.

(10) Patent No.: US 10,528,735 B2
(45) Date of Patent: Jan. 7, 2020

(54) MALICIOUS CODE PROTECTION FOR COMPUTER SYSTEMS BASED ON PROCESS MODIFICATION

(71) Applicant: MORPHISEC INFORMATION SECURITY 2014 LTD., Beer Sheva (IL)

(72) Inventors: Michael Gorelik, Beer Sheva (IL); Mordechai Guri, Modiin (IL); David Mimran, Tel Aviv (IL); Gabriel Kedma, Omer (IL); Ronen Yehoshua, Matan (IL)

(73) Assignee: Morphisec Information Security 2014 Ltd., Beer Sheva (IL)

( * ) Notice: Subject to any disclaimer, the term of this patent is extended or adjusted under 35 U.S.C. 154(b) by 0 days.

(21) Appl. No.: 15/324,656

(22) PCT Filed: May 8, 2015

(86) PCT No.: PCT/IB2015/053394
§ 371 (c)(1),
(2) Date: Jan. 6, 2017

(87) PCT Pub. No.: WO2016/079602
PCT Pub. Date: May 26, 2016

(65) Prior Publication Data
US 2017/0206357 A1    Jul. 20, 2017

Related U.S. Application Data

(60) Provisional application No. 62/080,841, filed on Nov. 17, 2014.

(51) Int. Cl.
*G06F 21/56* (2013.01)
*G06F 21/52* (2013.01)
*G06F 21/54* (2013.01)

(52) U.S. Cl.
CPC ............ *G06F 21/566* (2013.01); *G06F 21/52* (2013.01); *G06F 21/54* (2013.01); *G06F 2221/034* (2013.01)

(58) Field of Classification Search
CPC ..................................................... G06F 21/566
See application file for complete search history.

(56) References Cited

U.S. PATENT DOCUMENTS

| 5,708,811 A | * | 1/1998 | Arendt | G06F 9/44521 |
| | | | | 711/203 |
| 6,499,137 B1 | * | 12/2002 | Hunt | G06F 9/44521 |
| | | | | 717/164 |

(Continued)

FOREIGN PATENT DOCUMENTS

| WO | 2014/051608 A1 | 4/2014 |
| WO | 2016/079602 A1 | 5/2016 |

OTHER PUBLICATIONS

International Preliminary Report on Patentability received for PCT Patent Application No. PCT/IB2015/053394, dated Jun. 1, 2017, 9 pages.

(Continued)

*Primary Examiner* — Simon P Kanaan
(74) *Attorney, Agent, or Firm* — Fiala & Weaver P.L.L.C.

(57) ABSTRACT

Various approaches are described herein for, among other things, detecting and/or neutralizing attacks by malicious code. For example, instance(s) of a protected process are modified upon loading by injecting a runtime protector that creates a copy of each of the process' imported libraries and maps the copy into a random address inside the process' address space to form a "randomized" shadow library. The libraries loaded at the original address are modified into a stub library. Shadow and stub libraries are also created for libraries that are loaded after the process creation is finalized. Consequently, when malicious code attempts to (Continued)

retrieve the address of a given procedure, it receives the address of the stub procedure, thereby neutralizing the malicious code. When the original program's code (e.g., the non-malicious code) attempts to retrieve the address of a procedure, it receives the correct address of the requested procedure (located in the shadow library).

20 Claims, 7 Drawing Sheets

(56) References Cited

U.S. PATENT DOCUMENTS

| | | | |
|---|---|---|---|
| 6,728,963 B1* | 4/2004 | Forin | G06F 9/44521 |
| | | | 718/100 |
| 6,941,510 B1* | 9/2005 | Ozzie | G06F 17/2205 |
| | | | 707/E17.118 |
| 7,171,693 B2 | 1/2007 | Tucker et al. | |
| 7,415,702 B1 | 8/2008 | Hoa et al. | |
| 7,555,780 B2 | 6/2009 | Tucker et al. | |
| 7,904,959 B2 | 3/2011 | Sidiroglou et al. | |
| 7,971,249 B2 | 6/2011 | Horne | |
| 8,341,627 B2 | 12/2012 | Mohinder | |
| 8,627,305 B1 | 1/2014 | Dalcher et al. | |
| 8,689,193 B2 | 4/2014 | Hazra | |
| 8,694,738 B2 | 4/2014 | Bhattacharjee et al. | |
| 8,713,679 B2 | 4/2014 | Zorn et al. | |
| 8,763,103 B2 | 6/2014 | Locasto et al. | |
| 9,432,298 B1* | 8/2016 | Smith | H04L 49/9057 |
| 2005/0097246 A1 | 5/2005 | Chen | |
| 2008/0152071 A1* | 6/2008 | Morgia | G06F 11/3466 |
| | | | 377/1 |
| 2009/0126017 A1 | 5/2009 | Chahal | |
| 2012/0233612 A1 | 9/2012 | Beckett | |
| 2014/0229717 A1 | 8/2014 | Venkat et al. | |
| 2014/0359773 A1 | 12/2014 | Matthews et al. | |
| 2016/0092674 A1* | 3/2016 | Hughes | G06F 21/52 |
| | | | 726/22 |

OTHER PUBLICATIONS

Communication pursuant to Article 94(3) EPC received for European Patent Application No. 15723305.7, dated Jul. 20, 2017, 9 pages.

International Search Report and Written Opinion received for PCT Patent Application No. PCT/IB2015/053394, dated Jul. 31, 2015, 10 pages.

* cited by examiner

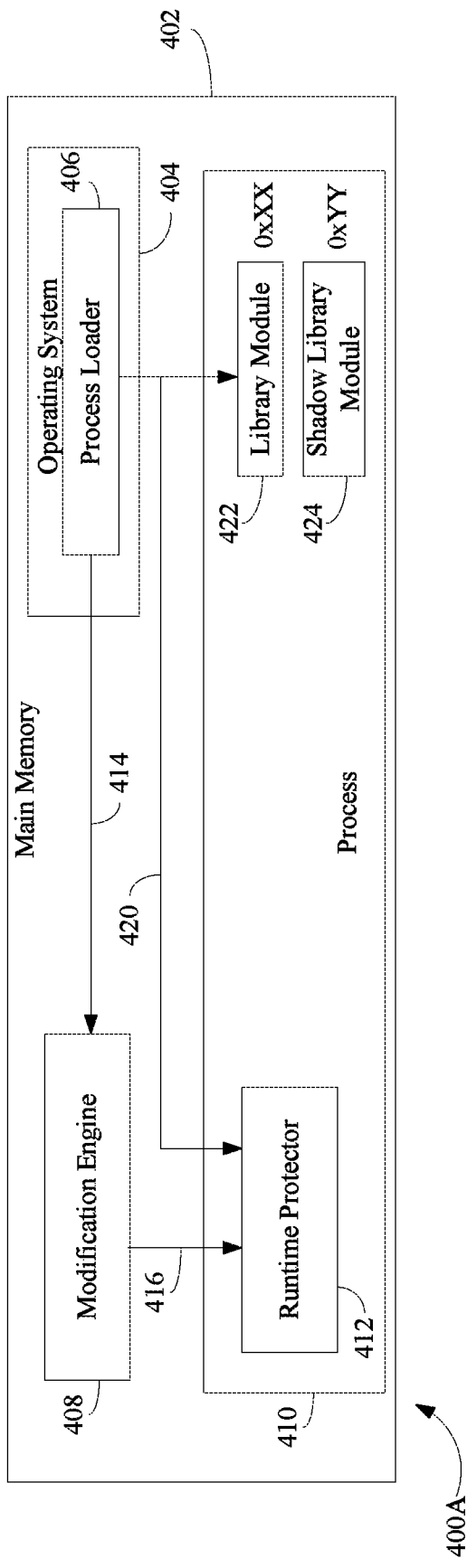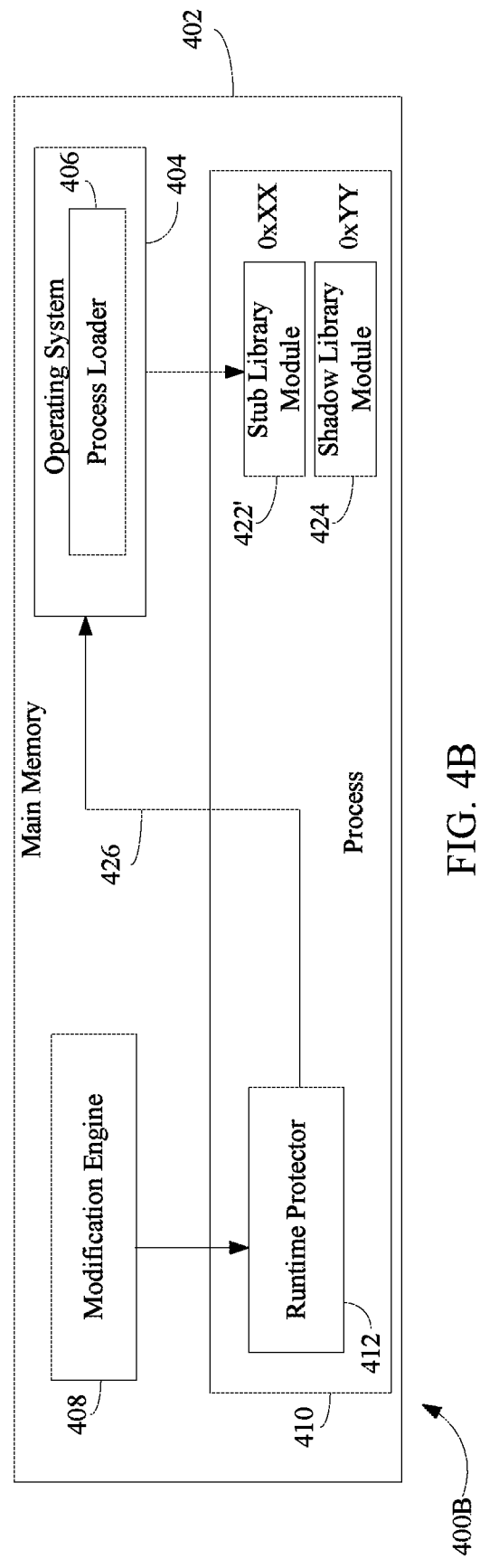
FIG. 4A
FIG. 4B

MALICIOUS CODE PROTECTION FOR COMPUTER SYSTEMS BASED ON PROCESS MODIFICATION

This application is a U.S. national phase of International Application No. PCT/IB2015/053394 filed May 8, 2015, which designated the U.S. and claims priority to U.S. Provisional Application No. 62/080,841 filed Nov. 17, 2014, the entireties of which are incorporated by reference herein.

BACKGROUND

Technical Field

Embodiments described herein generally relate to detecting and/or neutralizing malicious code or other security threats on computer systems.

Description of Related Art

Modern cyber attackers employ a variety of attack patterns, ultimately aimed at running the attacker's code on the target machine without being noticed. The traditional attack pattern requires an executable file that arrives at the target machine through email, through a download from a website, from a neighboring local host, or from some sort of removable media. When the malicious file gets executed, it spawns a full-fledged process of its own. Subsequently, the malicious process may inject some form of code into the memory-space of another running process.

Newer attack patterns are based on vulnerabilities found in various useful programs, such as ADOBE® ACROBAT®. In the case of ADOBE® ACROBAT®, the malicious code (or "payload") is embedded within a portable data file (PDF) document. The PDF document also contains a chunk of malformed data, designed to exploit the given vulnerability. This chunk is crafted to cause some kind of overflow or similar exception when the file is being read by the vulnerable program. When the program or the operating system seeks to recover, it returns, instead, to a tiny piece of machine code (or primary shellcode) supplied by the malformed data chunk. This primary shellcode takes control of the running program (i.e., the process), completing the so-called "exploit" of the given vulnerability. Subsequently, the primary shellcode loads whatever payload (special-purpose malicious code) is available, into the context of the running process.

In a so-called 'remote' attack, the vulnerable program is associated with some network port, either as a server or as a client. The exploit happens when the vulnerable program tries to process a chunk of malformed input, essentially in the same manner as described above. In this case, when the primary shellcode takes control of the running process, it may choose to download secondary shellcode or payload from the network. In both the local and the remote vulnerability-based attacks, the malicious code running within the originally breached process may proceed by injecting code into the running processes of other programs.

Traditional malware-detection tools, such as signature-based antivirus products, are ineffective against such attacks due to the fact these attacks take form in memory, thereby resulting in no visible signature for the malicious file. Conventional runtime activity monitoring, based on the behavioral patterns of such attacks, fail to defend against attacks due to the fact that such attacks morph themselves and change their behavior, thereby making it difficult to define strict rules that lead to the identification of malicious behavior. Accordingly, conventional runtime activity monitoring has some major drawbacks, including: (a) it may miss a new, unknown pattern; (b) detection may occur too late for the monitoring program to take an effective preventive action; and (c) the required computational resources may affect the system's performance. In general, these tools rely on some prior knowledge of an attack pattern or a vulnerability, and will miss so-called "zero-day" attacks (new forms of attack, which exploit unknown vulnerabilities in the target software), whether the attack is remote or local.

Protective techniques such as Address Space Layout Randomization (ASLR) and Data Execution Prevention (DEP) are used in modern computerized systems to prevent malicious-code attacks. However, recent sophisticated attacks, such as attacks that are able to deduce the location of desired functionality based on relative addressing, have demonstrated the limitations of ASLR and DEP.

BRIEF SUMMARY

Methods, systems, and apparatuses are described for detecting and/or neutralizing malicious code or other security threats on computer systems, substantially as shown in and/or described herein in connection with at least one of the figures, as set forth more completely in the claims.

BRIEF DESCRIPTION OF THE DRAWINGS

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 4A depicts a block diagram of a main memory including a process in accordance with an embodiment.

FIG. 4B depicts a block diagram of a main memory including a process in accordance with another embodiment.

Figure 1:
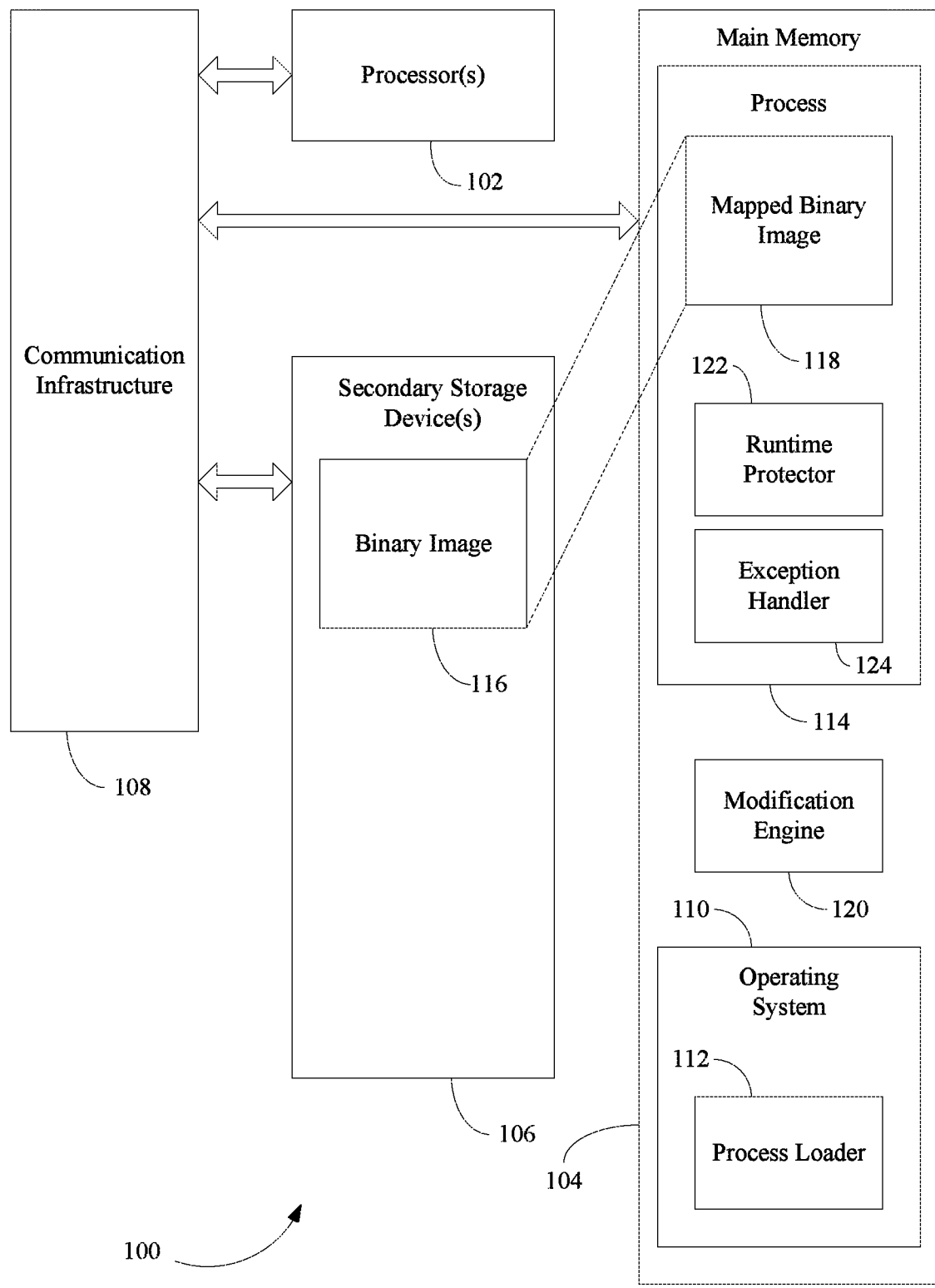
FIG. 1 depicts components of a computer system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Numerous exemplary embodiments are now described. Any section/subsection headings provided herein are not intended to be limiting. Embodiments are described throughout this document, and any type of embodiment may be included under any section/subsection. Furthermore, it is contemplated that the disclosed embodiments may be combined with each other in any manner.

II. Example Embodiments

Malicious code (e.g., malware) including injected shellcode, relies on some basic assumptions regarding the runtime context of the target in order to initialize itself and to execute its payload properly. In general, shellcode injected into a running process has to perform some initial steps before it can proceed. It should do at least part of the initiation steps that the system's default loader would normally do when creating a running process from an executable file (e.g., a binary image). In particular, it is crucial for the injected code to obtain the addresses of certain shared libraries (e.g., dynamic-link libraries (DLLs)) as they are mapped into the address space of the running process, and to further obtain the addresses of the procedures (or functions) that it intends to use. In the case where the vulnerability resides inside a shared library, the injected code only needs to find the specific functionality within that library and does not need to locate the library itself.

Various approaches are described herein for, among other things, neutralizing and/or detecting attacks by such malicious code. This may be achieved, for example, by modifying one or more instances of a protected process upon loading by injecting a runtime protector that (a) creates a copy of each of the process' imported libraries and maps the copy into a random address inside the process' address space (to form a randomized "shadow" library), (b) replaces the procedure addresses within the original libraries, to point at a stub (thereby forming a "stub" library), and (c) intercepts procedure calls for late library loading and creates a shadow library and a stub library for such libraries.

The above technique is referred to herein as "morphing." In one implementation of this technique, the addresses of the shadow libraries (and procedures included therein) are randomized, ensuring that each process and each process' instance obtain a unique protective shield. In accordance with an embodiment, morphing is performed dynamically during initialization of the process, where librar(ies) loaded during process initialized are morphed. In accordance with another embodiment, morphing is performed dynamically during runtime, where librar(ies) loaded during runtime (i.e., after process initialization is complete) are morphed.

In further accordance with this technique, when injected (e.g., malicious) code attempts to retrieve the address of a given procedure, it will be directed to the stub library (the library at the original address) and receive the address of the stub procedure. Consequently, the injected code will not be able to perform its malicious activities. Furthermore, its presence can be detected. However, when the original program's code (e.g., the non-malicious code) attempts to retrieve the address of a procedure, it will use the address of the shadow library and receive the correct address of the requested procedure. Consequently, the original program's code will proceed normally.

Various embodiments described herein offer at least the following additional advantages: (a) when the presence of malicious code is detected, the malicious code can be sandboxed or otherwise diverted to a secure environment, to deceive the attacker and/or to learn the malware's behavior and intentions; (b) a user or administrator can define, for a given process, a set of procedure calls that are prohibited under any circumstances (also referred to herein as an "API Firewall"); (c) the overall impact on the system's performance may be relatively low, particularly compared to runtime behavioral monitoring, which tries to detect malicious code rather than preempt it; and (d) no prior knowledge of the current malware is assumed, therefore prevention of new, unknown, or zero-day attacks is possible.

Furthermore, embodiments described herein overcome the limitations of ASLR and DEP, and can be applied in concert with those techniques to gain optimal protection.

For the sake of brevity, embodiments described herein are described in terms of the MICROSOFT® WINDOWS® Operating System (OS), published by Microsoft Corporation of Redmond, Wash. However, as should be clear to any person skilled in the art, this is just one possible embodiment. Similar embodiments may protect practically all kinds of modern operating systems, including LINUX® and other UNIX® variants, against a very wide array of malicious-code attacks, whether remote or local.

Additionally, embodiments described herein refer to morphing techniques associated with library(ies) for the sake of brevity. However, as should be clear to any person skilled in the art, this is just one possible embodiment. Similar embodiments may protect practically all kinds of codebase elements, including, but not limited to, DLL extensions, Component Object Models (COMs), etc.

In particular, a method is described herein. The method includes determining that a process loader of an operating system has initiated the creation of a computing process. In response to determining that the process loader has initiated the creation of the computing process, code is injected in the computing process that is configured to modify the computing process by determining that at least one library module of the computing process is to be loaded into memory, storing the at least one library module at a first address in the memory, copying the at least one library module stored at the first address to a second address in the memory that is different than the first address, and modifying the at least one library module stored at the first address into a stub library module.

A system is also described herein. The system includes one or more processing units and a memory coupled to the one or more processing units, the memory storing software modules for execution by the one or more processing units.

The software modules include a runtime protector configured to load a library module for the computing process at a first address in the memory, copy the library module stored at the first address to a second address in the memory that is different than the first address, and modify the library module stored at the first address into a stub library module. The code that accesses the library module stored at the second address is designated as being non-malicious code. The code attempting to access the library module stored at the first address is designated as being malicious code.

A computer-readable storage medium having program instructions recorded thereon that, when executed by a processing device, perform a method for modifying a computing process is further described herein. The method includes loading a library module for the computing process at a first address in the memory, copying the library module stored at the first address to a second, randomized address in the memory that is different than the first address, and modifying the library module stored at the first address into a stub library module. The code that accesses the library module stored at the second address is designated as being non-malicious code. The code attempting to access the library module stored at the first address is designated as being malicious code.

III. Example Systems and Methods for Detecting and/or Neutralizing the Execution of Malicious Code FIG. 1 depicts components of a computer system 100 in accordance with one embodiment that detects and/or neutralizes the execution of malicious code associated with a computing process executing thereon. As shown in FIG. 1, computer system 100 includes one or more processor(s) 102 (also called central processing units, or CPUs), a primary or main memory 104, and one or more secondary storage device(s) 106. Processor(s) 102, main memory 104, and secondary storage device(s) 106 are connected to a communication interface 108 via a suitable interface, such as one or more communication buses. In some embodiments, processor(s) 102 can simultaneously operate multiple computing threads, and in some embodiments, processor(s) 102 may each comprise one or more processor core(s). Examples of main memory 104 include a random access memory (RAM) (e.g., dynamic RAM (DRAM), synchronous DRAM (SDRAM), dual-data rate RAM (DDRRAM), etc.). Secondary storage device(s) 106 include for example, one or more hard disk drives, one or more memory cards, one or more memory sticks, a floppy disk, magnetic tape, compact disk, DVD, optical storage disk, or any other computer data storage device.

As shown in FIG. 1, main memory 104 stores an operating system 110. Operating system 110 may manage one or more hardware components (e.g., processor(s) 102, main memory 104, secondary storage device(s) 106, etc.) and software executing on computer system 100. Example hardware components of computer system 100 are described in detail below in reference to FIG. 9.

Operating system 110 may have one or more components that perform certain tasks relating to the execution of software on computer system 100. One such component is process loader 112. Process loader 112 is configured to initiate creation of a computing process (or "process") 114 in main memory 104. Process 114 is an instance of a computer program being executed by processor(s) 102. The computer program may comprise an application program (or "application"), a system program, or other computer program being executed by processor(s) 102. The computer program is embodied in instructions and/or data included in a binary image (e.g., binary image 116).

To initiate creation of process 114, process loader 112 loads (or "maps") binary image 116, which is stored in secondary storage device(s) 106, into an address space allocated for process 114 in main memory 104 based on information included in binary image 116. The binary image mapped into main memory 104 is represented in FIG. 1 by mapped binary image 118. Process loader 112 builds up an initial execution context of process 114. Computer program execution (i.e., process 114) begins when processor(s) 102 commence executing the first instruction of the computer program. Process 114 may comprise one or more threads of execution that execute a subset of instructions concurrently.

As the program execution evolves, other component(s) of operating system 110 allocate various resources to process 114. The execution context of process 114 may comprise information about such resource allocation, a current state of the program execution, an instruction that is to be executed next, and other information related to the program execution. The computer program execution continues until processor(s) 102 execute a termination or halt instruction.

Additional information regarding the information included in binary image 116 and how process loader 112 maps binary image 116 into main memory 104 based on this information is described below with reference to FIG. 2.

Figure 2:
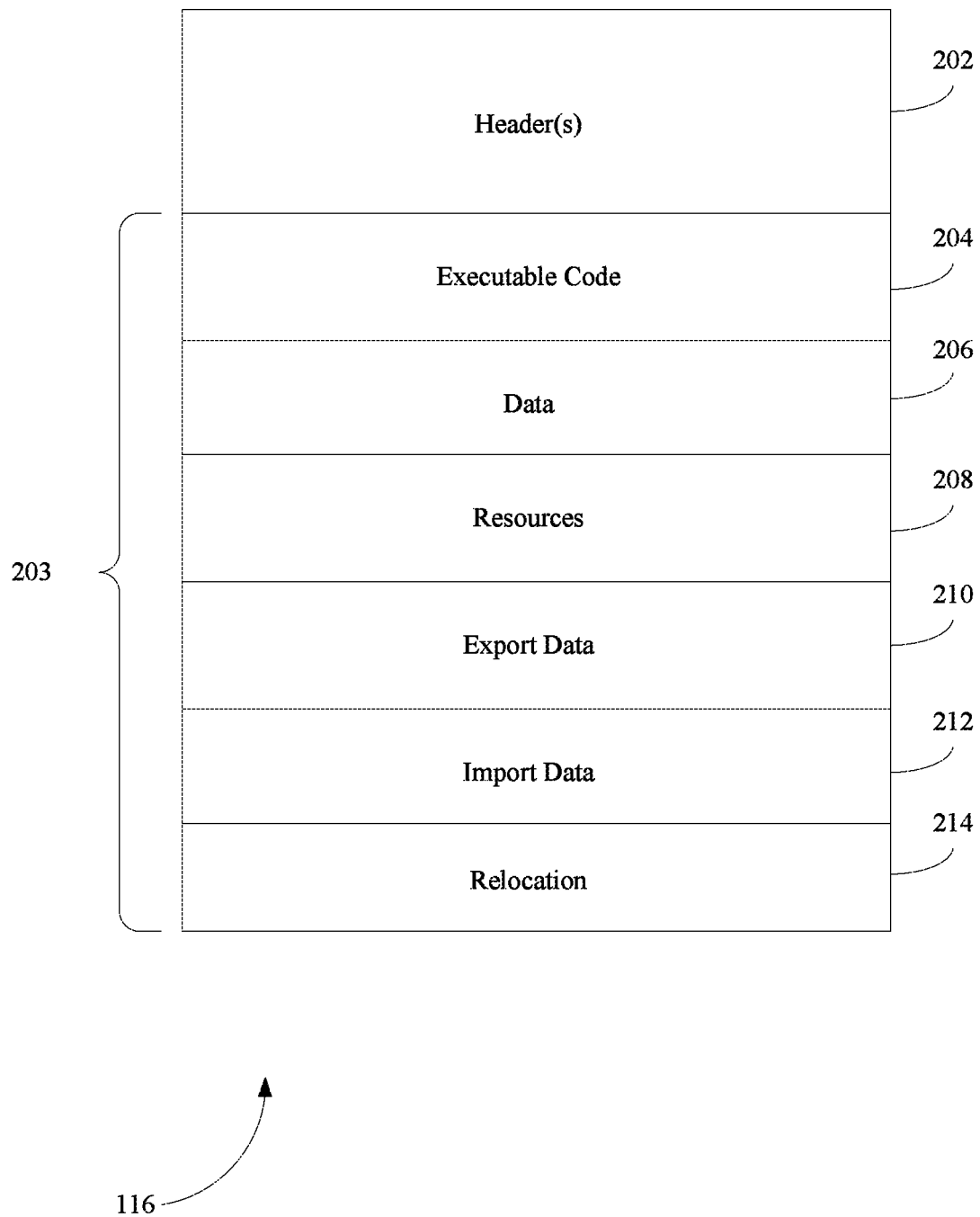
FIG. 2 depicts a layout of a binary image in accordance with an embodiment.

FIG. 2 is an example layout of binary image 116 in accordance with an embodiment. Examples of executable binary formats for binary image 116 include, but are not limited to, the portable executable (PE) format (e.g., files having an .exe, .dll, and a .sys extension), the Executable and Linkable Format (ELF), the Mach object (Mach-O) file format, etc.

As shown in FIG. 2, binary image 116 may comprise one or more headers 202 and/or one or more sections 203, which process loader 112 uses to map binary image 116 (or portions thereof) into main memory 104. Header(s) 202 may comprise information regarding the layout and properties of binary image 116 (e.g., the names, number and/or location of section(s) 203 within binary image 116). Header(s) 202 may also include a base address (also referred to as an image base) that specifies a default address at which binary image 116 is to be loaded into main memory. It is noted, however, that binary image 116 may be loaded at a different address. For example, if operating system 110 supports ASLR (which is technique used to guard against buffer-overflow attacks by randomizing the location where binary images are loaded into main memory 104), the address at which binary image 116 is loaded into main memory 104 will be a randomized address.

Section(s) 203 of binary image 116 may comprise an executable code section 204, a data section 206, a resources section 208, an export data section 210, an import data section 212 and a relocation section 214. Executable code section 204 comprises instructions that correspond to the computer program to be executed by processor(s) 102. The instructions may be machine code instructions that are to be executed by processor(s) 102 after binary image 116 is loaded into main memory 104.

Data section 206 comprises uninitialized data required for executing the computer program. Such data includes, but is not limited to, static and/or global variables. Resources section 208 comprises resource information that comprises read-only data required for executing the computer program. Such read-only data includes, but is not limited to, icons, images, menus, strings, etc. The read-only data may be stored in one or more tables (i.e., resource table(s)).

Export data section 210 may include information about the names and/or references of procedures exportable to other binary image(s) (e.g., DLL(s)). The export data may include an export directory that defines the names of exportable procedures included in binary image 116. The addresses of the exportable procedures may be stored in a table (e.g., an export address table (EAT)). The addresses of such exportable procedures may be provided to other binary images in response to the issuance by such other binary images of a procedure call (e.g., GetProcAddress) that identifies the procedure.

Import data section 212 may include information about the names and/or references of procedures that are imported by binary image 116. Import data section 212 may comprise an import directory, which includes information about other binary image(s) (e.g., DLL(s)) from which binary image 116 imports procedures. The information may include a location (e.g., an address) or a pointer to a location of a binary image that includes at least one procedure to be imported. The information may further include an import address table (IAT) that includes the name(s) of procedures to be imported and/or pointers to the procedures to be imported.

During process loading, process loader 112 may check the import data (e.g., the IAT) to determine if one or more additional binary images (e.g., libraries, such as DLLs) are required for process 114. Process loader 112 may map any such required binary image(s) into the address space of process 114. Process loader 114 may recursively parse the respective IATs of each required binary image to determine if further binary image(s) are required and map these further binary image(s) into the address space of process 114.

Process loader 112 replaces the pointers in the respective IATs with the actual addresses at which the procedures are loaded into main memory 104 as the procedures are imported. By using pointers, process loader 112 does not need to change the addresses of imported procedures everywhere in code of the computer program that such imported procedures are called. Instead, process loader 112 simply has to add the correct address(es) to a single place (i.e., the IAT), which is referenced by the code.

Relocation data section 214 comprises relocation data that enables process loader 112 to modify addresses associated with code and data items (respectively included in executable code section 204 and data section 206) specified in binary image 116. When a binary image is created (e.g., by a computer program, such as a linker), an assumption is made that the binary image is to be mapped to a base address, as described above. Based on this assumption, the linker inserts the real addresses (relative to the base address) of code and data items in the binary image. If for some reason the binary image is loaded at an address other than the image base (e.g., in the event that the image base is already occupied or due to an ASLR scheme being in place), these real addresses will be invalid. The relocation data enables process loader 112 to modify these addresses in binary image 116 so that they are valid. For example, the relocation data may include a relocation table, which includes a list of pointers that each point to a real address of a code and/or data item. When binary image 116 is remapped to an address other than the image base, process loader 112 updates these pointers. Thereafter, process loader 112 initiates the computer program by passing control to the program code loaded into main memory 104.

Returning to FIG. 1, in accordance with an embodiment, system 100 is configured to neutralize and/or intercept runtime in-memory exploits of processes (e.g., exploits performed by malicious code). Such exploits are carried out by identifying the memory location of a specific known object (e.g., of a procedure or data object having a predetermined fixed address) in a process' address space in main memory and using this location to calculate the location of other procedures that are required to fulfill the exploit.

To neutralize such exploits, system 100 may include a modification engine 120, which executes in main memory 104. Modification engine 120 may be configured to modify (or "morph") process 114 to include a runtime protector 122 that causes the location of the in-memory data and code segments to be changed upon being loaded into main memory 104 in a random manner and updates legitimate code segments (i.e., non-malicious code segments) with these changes, thereby preventing malicious code from accessing such data and code segments. Furthermore, runtime protector 122 maintains the original in-memory data and code segments and intercepts any access to these segments to detect malicious activity.

For example, modification engine 120 may be configured to intercept a process creation event issued by operating system 110 (or a component thereof) for process 114. Modification engine 120 may verify that process 114 is designated for protection. For example, modification engine 120 may check that process 114 is included in a list of processes that should be protected. In response to determining that process 114 is to be protected, modification engine 120 causes the creation of the process to be suspended and injects runtime protector 122 into process 114. Runtime protector 122 may be a library (e.g., a DLL) that is injected into the address space of process 114.

Runtime protector 122 may be configured to determine whether any library modules (e.g., DLLs) have already been loaded into the address space of process 114. In response to determining that library module(s) have already been loaded into the address space of process 114, runtime protector 122 copies the library module(s) into a different, random memory range (referred to as a "shadow" library). The library module(s) loaded into the original address space are modified into a stub library (also referred to as a "shallow library"), which provides stub procedures or functions. Runtime protector 122 updates the IAT mapped into the address space of process 114 with the addresses corresponding to the random memory range. Thereafter, modification engine 120 causes process loader 112 to be released to allow process loader 112 to finalize the process creation for process 114.

Runtime protector 122 may also be configured to create shadow and stub libraries for library module(s) that are loaded after process finalization (e.g., "late" libraries). For example, runtime protector 122 may be configured to hook memory mapping procedure calls (e.g., that map libraries to a particular section of main memory 104, such as NtMapViewOfSection) that load "late" library module(s) into main memory 104. Upon intercepting such procedure calls, runtime protector 122 allows the call to be completed, thereby resulting in the library module(s) being loaded at their intended addresses in main memory 104. Thereafter, runtime protector 122 creates shadow and stub libraries for such library module(s) in a similar manner as described above.

Thus, when the original, non-malicious code attempts to retrieve a library module handle of a library module including the procedure requested for and/or the address of the procedure in one of the library module(s), it will receive the library module handle of shadow library module and/or the address of the procedure in the shadow library module. Consequently, the original program's code will proceed normally as planned. However, when malicious code attempts to retrieve the library module handle of the same library module including the same procedure and/or the address of the procedure in the library module, the malicious code will receive the library module handle of the stub library module and/or the address of a procedure in the stub library module. Consequently, the malicious code will not be able perform its malicious activities.

In addition, the presence of the malicious code may be detected upon accessing the stub library. For example, in accordance with an embodiment, runtime protector 122 modifies the library module(s) loaded into the original address space into stub libraries by causing operating system 110 to designate the original address spaces at which executable portions (e.g., executable code) of the library module(s) are located as being non-accessible regions. Modification engine 120 may also inject an exception handler 124 into the address space of process 114, which intercepts an exception thrown by operating system 110 when code (e.g., malicious code) attempts to access the non-accessible region (i.e., the stub library). Upon detecting the exception, runtime protector 122 may be configured to redirect the malicious code to an isolated environment and/or kill a thread spawned by the malicious code.

In accordance with an embodiment, malicious code is detected by a user-configurable API firewall. For example, a user or administrator may be enabled (e.g., using a graphical user interface (GUI)) to define, for any given process, a set of procedure calls that are prohibited under any circumstances.

Figure 3:
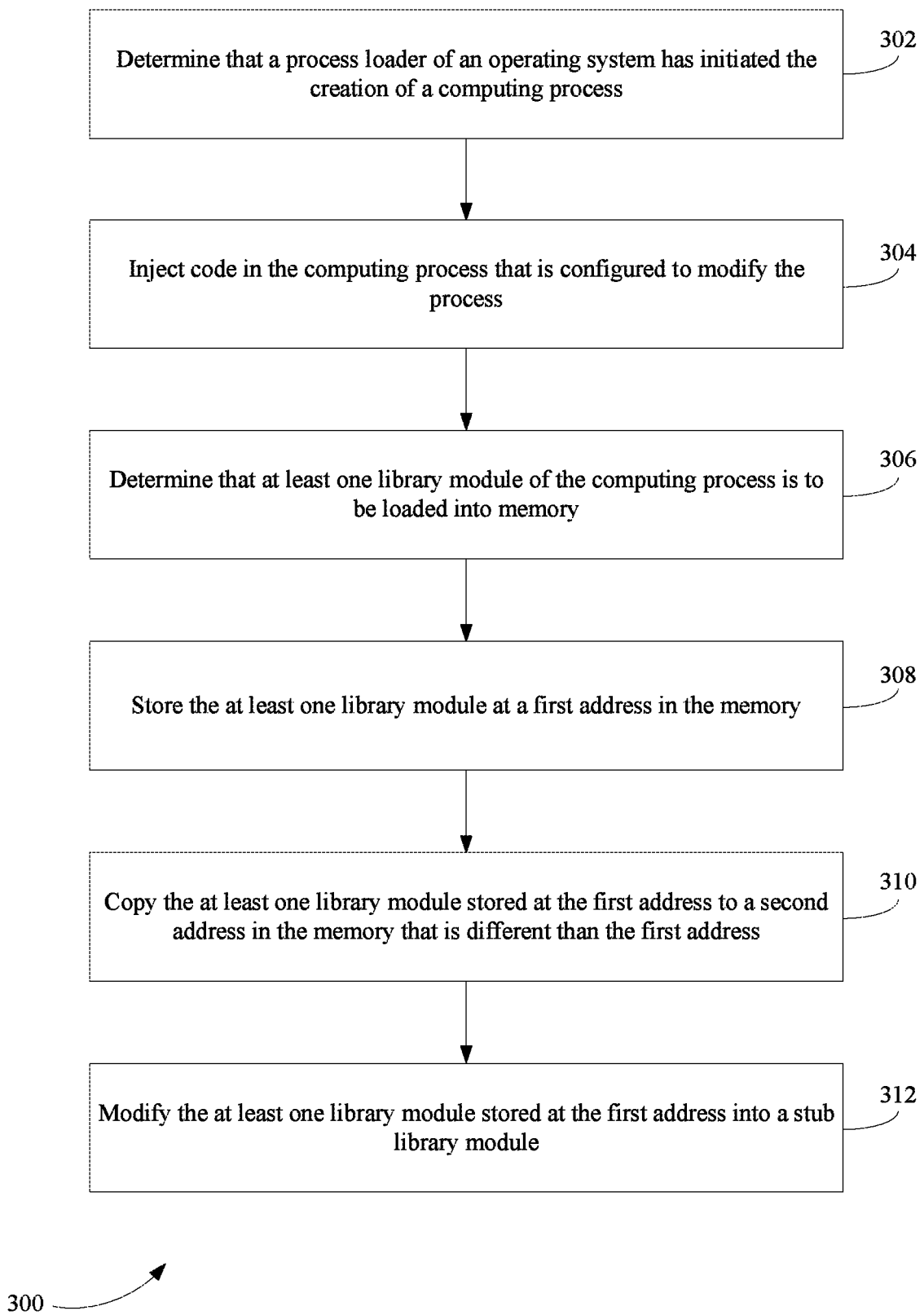
FIG. 3 depicts a flowchart of an example method for neutralizing runtime in-memory exploits of a process in accordance with an example embodiment.

Accordingly, in embodiments, system 100 may operate in various ways to neutralize runtime in-memory exploits of process. For example, FIG. 3 depicts a flowchart 300 of an example method for neutralizing runtime in-memory exploits of a process, according to an example embodiment. System 100 shown in FIG. 1 may operate according to flowchart 300. For illustrative purposes, flowchart 300 is described with reference to FIGS. 4A-4B. FIGS. 4A-4B show block diagrams 400A and 400B of main memory 402, according to an embodiment. Main memory 402 is an example of main memory 104 shown in FIG. 1. Accordingly, operating system 404, process loader 406, modification engine 408, process 410 and runtime protector 412 are examples of operating system 110, process loader 112, modification engine 120, process 114 and runtime protector 122, as shown in FIG. 1. Further structural and operational embodiments will be apparent to persons skilled in the relevant art(s) based on the discussion regarding flowchart 300. Flowchart 300 and main memory 402 are described as follows.

Flowchart 300 begins with step 302. At step 302, a determination is made that a process loader of an operating system has initiated the creation of a computing process. For example, as shown in FIG. 4A, modification engine 408 determines that process loader 406 of operating system 404 has initiated the creation of process 406. For instance, process loader 406 may initiate creation of process 410 in response to receiving a process creation event from operating system 404 (or from one or more other components of operating system 404). Modification engine 408 is configured to detect such events (e.g., event 414). In response to detecting event 414, modification engine 408 may verify that the corresponding process being created (e.g., process 410) is included in a list of processes to be protected. For example, modification engine 408 may query a database or search a file containing the list to determine whether the corresponding process is to be protected.

At step 304, code is injected in the computing process that is configured to modify the process in response to determining that the process loader has initiated the creation of the computing process. For example, as shown in FIG. 4A, modification engine 408 issues a procedure call 416 to inject code (e.g., runtime protector 412) into process 410. In accordance with an embodiment, runtime protector 412 is a DLL injected into the address space of process 410.

The injected code is configured to modify the process in accordance with steps 306, 308, 310 and 312 as described below. At step 306, a determination is made that at least one library module of the computing process is to be loaded into memory. For example, as shown in FIG. 4A, runtime protector 412 is configured to determine that at least one library module of process 410 is to be loaded into main memory 402. In accordance with an embodiment, runtime protector 412 determines that at least one library module of process 410 is to be loaded into main memory 402 by hooking a procedure call 420 initiated by process loader 406. Procedure call 420 may be configured to map at least one library module into main memory 402. Procedure call 420 may identify the at least one library module and a section of main memory 404 at which the at least one library module is to be loaded. In accordance with an embodiment, procedure call 420 is an NtMapViewOfSection procedure call.

At step 308, the at least one library module is stored at a first address in the memory. For example, as shown in FIG. 4, library module 422 is stored at a first address 0xXX. The first address may be specified by procedure call 420.

At step 310, the at least one library module stored at the first address is copied to a second address in the memory that is different than the first address. For example, as shown in FIG. 4, runtime protector 412 copies library module 422 stored at the first address to a second address (0xYY) in main memory 404 that is different than the first address (represented by shadow library module 424). In accordance with an embodiment, the second address is a randomized address determined by runtime protector 412.

At step 312, the at least one library module stored at the first address is modified into a stub library module. For example, with reference to FIG. 4B, runtime protector 412 modifies library module 422 (as shown in FIG. 4A) into a stub library module 422. In accordance with an embodiment, the second address is a randomized address determined by runtime protector 412. In accordance with an embodiment, runtime protector 412 modifies library module 422 (as shown in FIG. 4A) into a stub library module 422' (as shown in FIG. 4B) by causing one or more executable portions of library module 422 to be designated as being non-accessible. For example, runtime protector 412 may issue a command 426 to operating system 404 that causes operating system 404 to designate the executable portion(s) of library module 422 as non-accessible.

Figure 5:
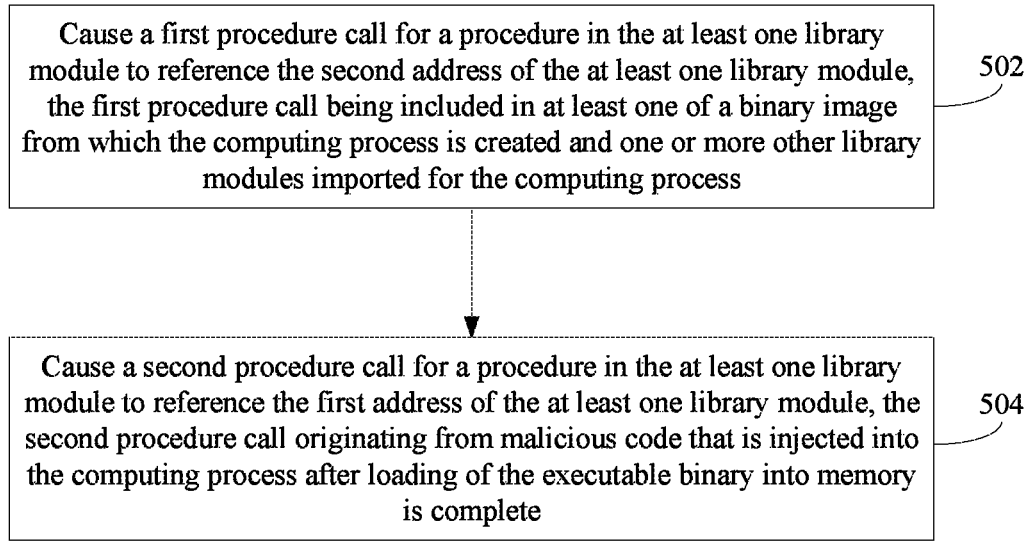
FIG. 5 depicts a flowchart of an example method for handling procedure calls for procedures in a library module after a computing process has been modified by injected code in accordance with an embodiment.
Figure 6:
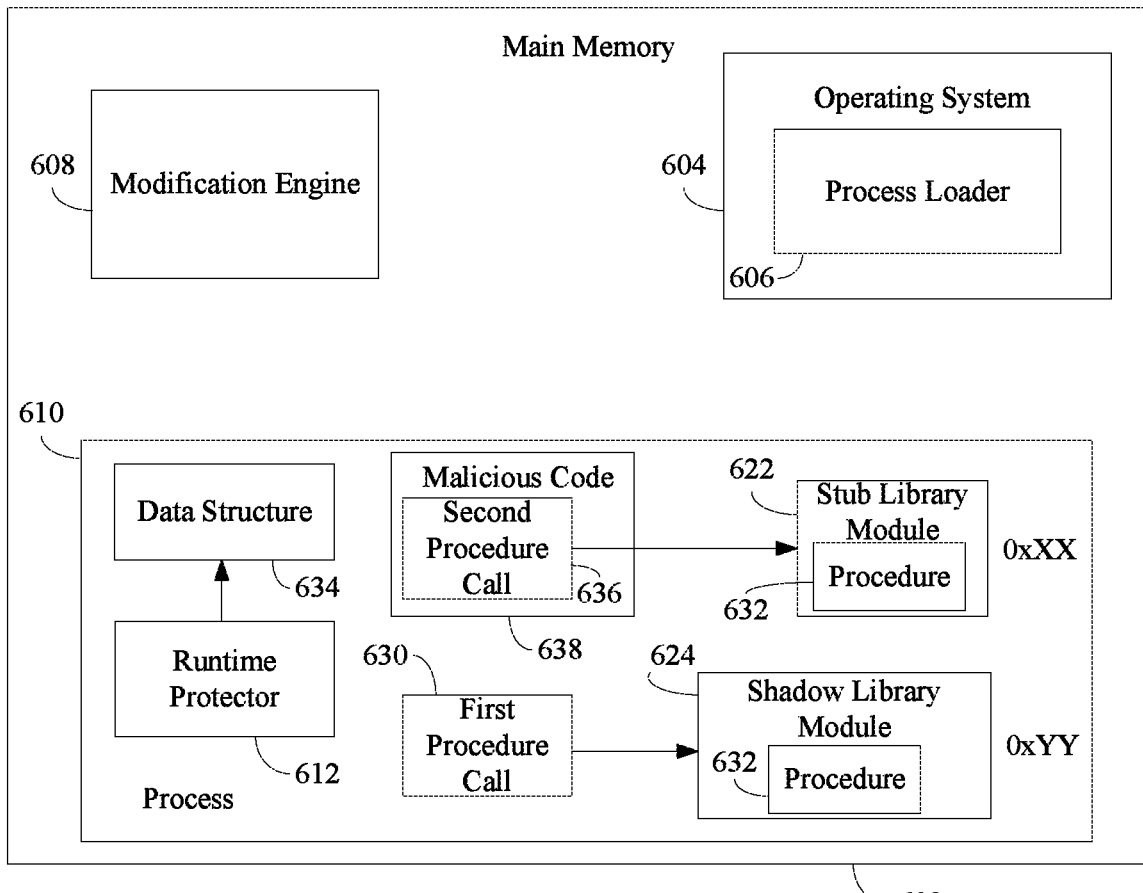
FIG. 6 depicts a block diagram of a main memory including a process in accordance with another embodiment.

FIG. 5 depicts a flowchart 500 of an example method for handling procedure calls for procedures in the at least one library module after the computing process has been modified by the injected code, according to an example embodiment. System 100 shown in FIG. 1 may operate according to flowchart 500. For illustrative purposes, flowchart 500 is described with reference to FIG. 6. FIG. 6 shows a block diagram 600 of main memory 602, according to an embodiment. Main memory 602 is similar to main memory 402, as shown in FIGS. 4A and 4B. Accordingly, operating system 604, process loader 606, modification engine 608, process 610, runtime protector 612, stub library module 622 and shadow library module 624 are examples of operating system 404, process loader 406, modification engine 408, process 410, runtime protector 412, stub library module 422 and shadow library module 424, as shown in FIGS. 4A and 4B. Further structural and operational embodiments will be apparent to persons skilled in the relevant art(s) based on the discussion regarding flowchart 500. Flowchart 500 and main memory 602 are described as follows.

Flowchart 500 begins with step 502. At step 502, a first procedure call for a procedure in the at least one library module is caused to reference the second address of the at least one library module, the first procedure call being included in at least one of a binary image from which the computing process is created and one or more other library modules imported for the computing process. For example, as shown in FIG. 6, a first procedure call 630 for a procedure 632 is caused to reference a library module at the second address (i.e., shadow library module 624). First procedure call 630 is initially included in at least one of a binary image (e.g., binary image 116 of FIG. 1) from which process 610 is created or another library module imported for the binary image. First procedure call 630 is loaded into the address space of process 610 of main memory 602 during the binary image mapping process described above.

In accordance with an embodiment, the first procedure call for the procedure in the at least one library module is caused to reference the second address of the at least one library module by updating a data structure that stores an address at which the at least one library module is loaded into the memory with the second address of the at least one library module, thereby causing the first procedure call to reference the second address of the at least one library module. For example, with reference to FIG. 6, runtime protector 612 is configured to update data structure 634 with the second address of the at least one library module. In accordance with an embodiment, the data structure is the IAT of the binary image (i.e., binary image 116, as shown in FIG. 1.) that is mapped into the address space of process 610.

At step 504, a second procedure call for a procedure in the at least one library module is caused to reference the first address of the at least one library module, the second procedure call originating from malicious code that is injected into the computing process after loading of the binary image into memory is complete. For example, as shown in FIG. 6, a second procedure call 636 for procedure 632 is caused to reference a library module at the first address (i.e., stub library module 622). As shown in FIG. 6, second procedure call 636 originates from malicious code 638. Malicious code 638 is code that was injected into process 610 after binary image 116 (as shown in FIG. 1) is mapped into main memory 604.

As described above, in accordance with an embodiment, certain executable portions of a library module stored at the first address (i.e., the stub library module) may be designated as being non-accessible. In accordance with such an embodiment, a malicious code attack is detected when malicious code attempts to access such non-accessible sections.

Figure 7:
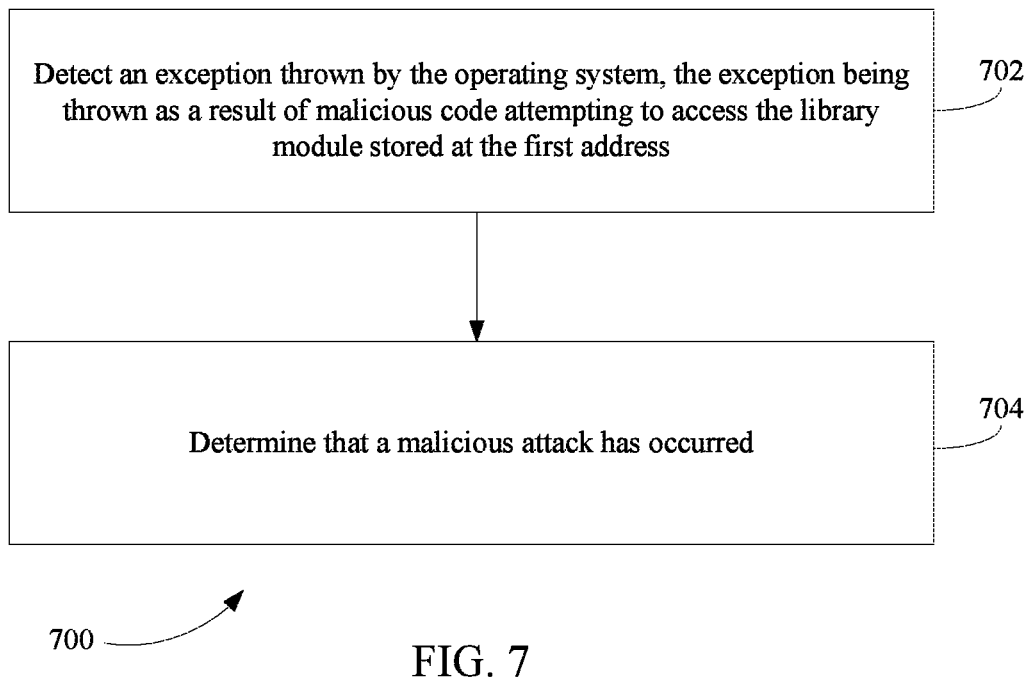
FIG. 7 depicts a flowchart of an example method for recovering execution of a computing process in response to a malicious code attack in accordance with an example embodiment.
Figure 8:
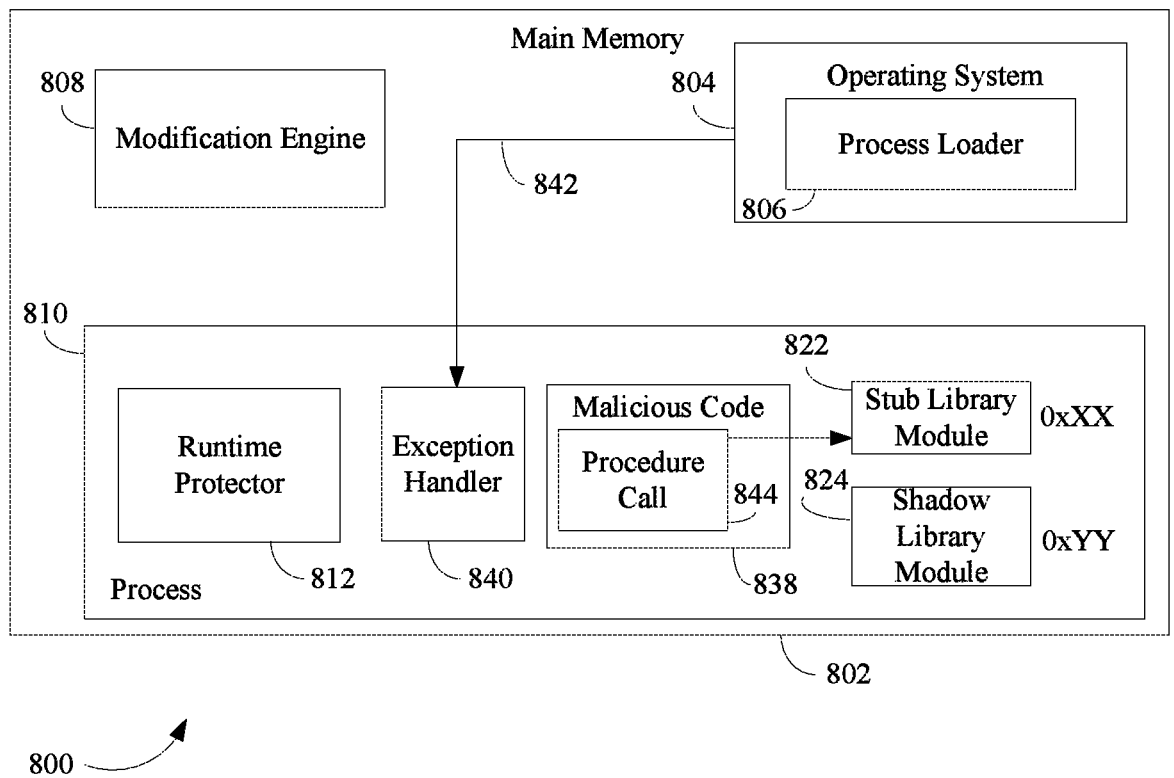
FIG. 8 depicts a block diagram of a main memory in accordance with another embodiment.

FIG. 7 depicts a flowchart 700 of an example method for detecting a malicious code attack, according to an example embodiment. System 100 shown in FIG. 1 may operate according to flowchart 700. For illustrative purposes, flowchart 700 is described with reference to FIG. 8. FIG. 8 shows a block diagram 800 of a main memory 802, according to an embodiment. Main memory 802 is similar to main memory 602 shown in FIG. 6. Accordingly, operating system 804, process loader 806, modification engine 808, process 810, runtime protector 812, stub library module 822, shadow library module 824 and malicious code 838 are examples of operating system 604, process loader 606, modification engine 608, process 610, runtime protector 612, stub library module 622, shadow library module 624 and malicious code 638, as shown in FIG. 6. Further structural and operational embodiments will be apparent to persons skilled in the relevant art(s) based on the discussion regarding flowchart 700. Flowchart 700 and main memory 802 are described as follows.

Flowchart 700 begins with step 702. At step 702, an exception thrown by the operating system is detected, the exception being thrown as a result of malicious code attempting to access the library stored at the first address. For example, with reference to FIG. 8, an exception handler 840 may also be injected into main memory 802; in particular, into the address space of process 810. Exception handler 840 may be injected into process 810 by modification engine 808. Exception handler 840 is configured to detect an exception 842 thrown by operating system 804. Exception 842 may be thrown in response to a procedure call 844 included in malicious code 838 attempting to access a procedure included in stub library module 822.

At step 704, a determination is made that a malicious attack has occurred in response to detecting the exception. For example, as shown in FIG. 8, runtime protector 812 may be configured to determine that a malicious attack has occurred in response to exception handler 840 detecting exception 842. Upon detecting exception 842, runtime protector 812 may be configured to redirect malicious code 838 to an isolated environment and/or kill a thread spawned by malicious code 838.

IV. Additional Embodiments for Process Modification

The foregoing description describes systems and methods for modifying a process by creating a copy of each of a process' imported libraries and mapping the copy to a randomized address to form a shadow library and modifying the libraries at the original address into a stub library module. However, as described below, a process may be modified in ways in addition to, or in lieu of, the techniques described above.

A. Import Address Table (IAT) and Export Address Table (EAT) Randomization

In accordance with an embodiment, at least one of a location at which the IAT and/or EAT (that are associated with the library module(s) of the shadow library) is loaded into main memory (e.g., main memory 104, as shown in FIG. 1) and one or more procedure names stored in the IAT and/or EAT are randomized. The location and/or the procedure name(s) may be randomized by the runtime protector (e.g., runtime protector 122, as shown in FIG. 1). Malicious code attacks that use techniques that address system functionality via known locations of the IAT and/or EAT addresses or via accessing a specific entry using a procedure name included in at least one of the IAT and EAT will fail by performing these randomizations. Consequently, an attacker would need to guess the location of the IAT and/or EAT in main memory and will not be able to use attack methods that enable access to procedures included in the IAT and/or EAT based on their names.

In accordance with another embodiment, one or more indices within the IAT and/or EAT that correspond to procedure name(s) included therein are randomized. The indices may be randomized by runtime protector 122, as shown in FIG. 1. By doing so, attacks accessing known system functionality via specific fixed indices corresponding to specific procedures will fail.

It is noted that the IAT and/or EAT associated with the stub library module(s) of the stub library are not randomized.

B. Resource Table Randomization

In accordance with an embodiment, at least one of a location at which the resource table(s) are loaded into main memory (e.g., main memory 104, as shown in FIG. 1), names, and/or references of resources included in the resource table(s) are randomized. The location of the resource table(s), the names, and/or references included in the resource table(s) may be randomized by the runtime protector (e.g., runtime protector 122, as shown in FIG. 1). Some attack techniques use resource table(s) in order to get a relative orientation into the process that can serve as a basis for building a dynamic attack using learned addresses in memory. Randomization of the resource table(s) will eliminate those exploitation techniques.

C. Process Environment Block and Thread Environment Block Randomization

In addition to tables and libraries, other data structures may also be loaded into the address space of a process. For example, a data structure used by the operating system to manage a process may also be loaded into the address space of the process. The structure may contain context information for the process that enables the operating system to manage execution of the process. Such a data structure may be referred to as a process environment block (PEB).

Another data structure that may be loaded in the address space of a process is a data structure used by the operating system to manage one or more threads associated with the process. The data structure may contain context information for the thread(s) that enables the operating to manage execution of the thread(s). Such a data structure may be referred to as a thread environment block (TEB).

In accordance with an embodiment, at least one of one or more elements, names and/or references included in the PEB and/or the TEB and/or the location of the PEB and/or the TEB may be randomized. The at least one of the element(s), name(s), and/or reference(s) and/or the locations of the PEB and/or TEB may be randomized by the runtime protector (e.g., runtime protector 122, as shown in FIG. 1). Malicious attacks that attempt to leverage information included in the PEB and/or TEB to determine locations of certain procedures, library modules, and/or tables (e.g., the IAT and/or EAT) will fail.

D. Exception Handler Randomization

As described above with reference to FIG. 8, modification engine 808 may inject an exception handler 840 into the address space of a process 810. In accordance with an embodiment, the location at which exception handler 840 is injected may be randomized. The location may be randomized by modification engine 808. Some attack techniques are abusing the exception handling mechanism embedded in processes to conduct malicious acts. Exception handlers are meant to serve program control in case of runtime errors. However, attackers are abusing this capability by accessing them in their known addresses and then injecting malicious code therein. The malicious code may cause a system error, which triggers the exception handler, thereby resulting in the malicious code taking control of the process. By randomizing the location of the exception handler, attackers will not be able to abuse it for obtaining runtime code control.

E. Other Randomizations

It is noted that tables and/or structures in addition to or in lieu of the tables and/or structures described above in subsections A-D may also be randomized to modify a process. However, such tables and/or structures are not described for the sake of brevity.

V. Example Computer System Implementation

Figure 9:
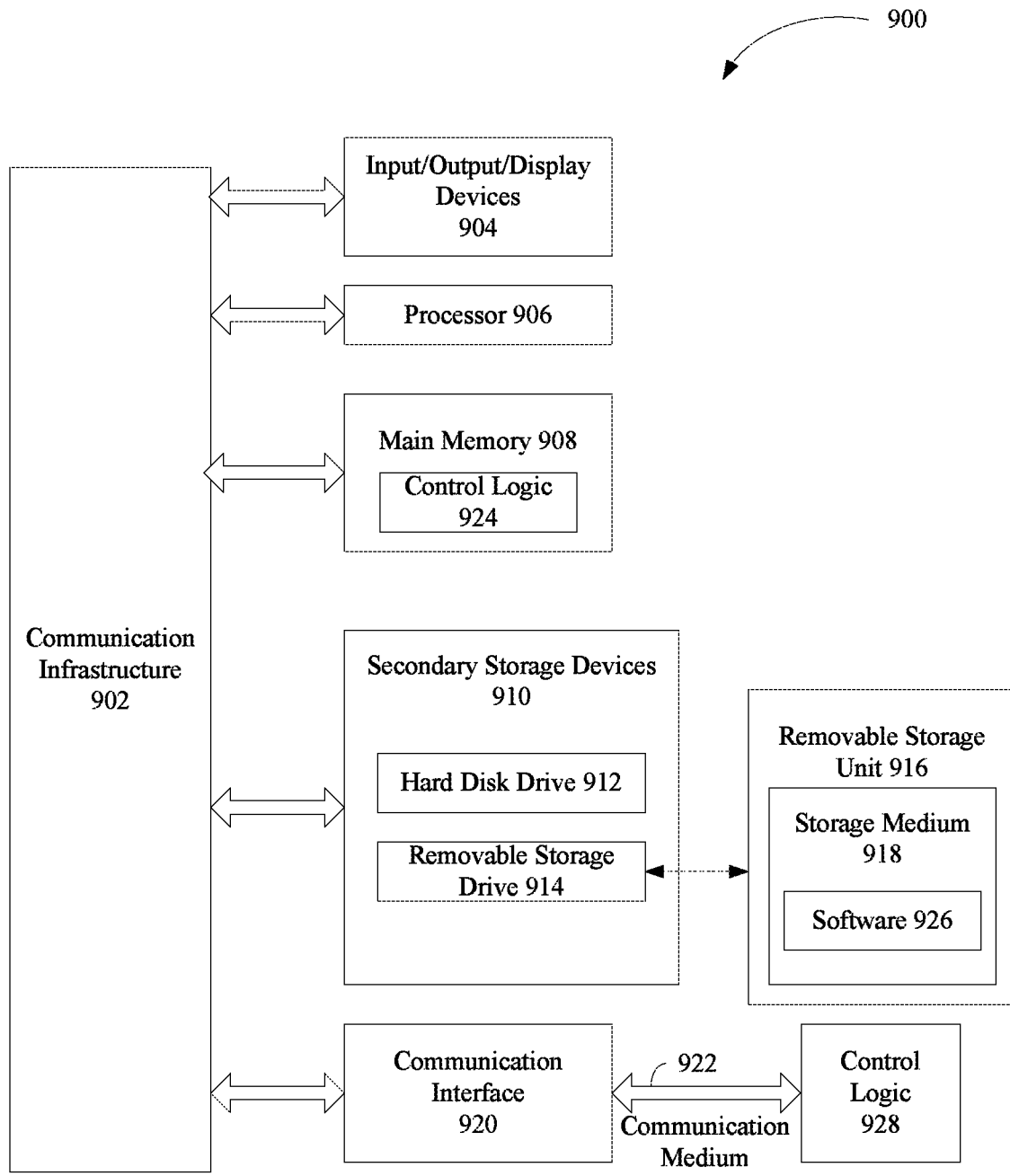
FIG. 9 depicts a block diagram of a computer system that may be configured to perform techniques disclosed herein.

The embodiments described herein, including systems, methods/processes, and/or apparatuses, may be implemented using well known processing devices, telephones (land line based telephones, conference phone terminals, smart phones and/or mobile phones), interactive television, servers, and/or, computers, such as a computer 900 shown in FIG. 9. It should be noted that computer 900 may represent computing devices linked to, processing devices, traditional computers, and/or the like in one or more embodiments. For example, computing system 100 of FIG. 1, and any of the sub-systems, components, and/or models respectively contained therein and/or associated therewith, may be implemented using one or more computers 900.

Computer 900 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 900 may be any type of computer, including a desktop computer, a server, etc.

Computer 900 includes one or more processors (also called central processing units, or CPUs), such as a processor 906. Processor 906 is connected to a communication infrastructure 902, such as a communication bus. In some embodiments, processor 906 can simultaneously operate multiple computing threads, and in some embodiments, processor 906 may comprise one or more processors.

Computer 900 also includes a primary or main memory 908, such as random access memory (RAM). Main memory 908 has stored therein control logic 924 (computer software), and data.

Computer 900 also includes one or more secondary storage devices 910. Secondary storage devices 910 include, for example, a hard disk drive 912 and/or a removable storage device or drive 914, as well as other types of storage devices, such as memory cards and memory sticks. For instance, computer 900 may include an industry standard interface, such a universal serial bus (USB) interface for interfacing with devices such as a memory stick. Removable storage drive 914 represents a floppy disk drive, a magnetic tape drive, a compact disk drive, an optical storage device, tape backup, etc.

Removable storage drive 914 interacts with a removable storage unit 916. Removable storage unit 916 includes a computer useable or readable storage medium 918 having stored therein computer software 926 (control logic) and/or data. Removable storage unit 916 represents a floppy disk, magnetic tape, compact disk, DVD, optical storage disk, or any other computer data storage device. Removable storage drive 914 reads from and/or writes to removable storage unit 916 in a well-known manner.

Computer 900 also includes input/output/display devices 904, such as touchscreens, LED and LCD displays, monitors, keyboards, pointing devices, etc.

Computer 900 further includes a communication or network interface 920. Communication interface 920 enables computer 900 to communicate with remote devices. For example, communication interface 920 allows computer 900 to communicate over communication networks or mediums 922 (representing a form of a computer useable or readable medium), such as LANs, WANs, the Internet, etc. Network interface 920 may interface with remote sites or networks via wired or wireless connections.

Control logic 928 may be transmitted to and from computer 900 via the communication medium 922.

Any apparatus or manufacture comprising a computer useable or readable medium having control logic (software) stored therein is referred to herein as a computer program product or program storage device. This includes, but is not limited to, computer 900, main memory 908, secondary storage devices 910, and removable storage unit 916. Such computer program products, having control logic stored therein that, when executed by one or more data processing devices, cause such data processing devices to operate as described herein, represent embodiments.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media and signals transmitted over wired media. Embodiments are also directed to such communication media.

The techniques and embodiments described herein may be implemented as, or in, various types of devices. For instance, embodiments may be included in mobile devices such as laptop computers, handheld devices such as mobile phones (e.g., cellular and smart phones), handheld computers, and further types of mobile devices, desktop and/or server computers. A device, as defined herein, is a machine or manufacture as defined by 35 U.S.C. § 101. Devices may include digital circuits, analog circuits, or a combination thereof. Devices may include one or more processor circuits (e.g., central processing units (CPUs) (e.g., processor 906 of FIG. 9), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method, comprising:
   determining that a process loader of an operating system has initiated the creation of a computing process; and
   in response to determining that the process loader has initiated the creation of the computing process, injecting code in the computing process that is configured to modify the computing process by:
      determining that at least one library module of the computing process is to be loaded into memory;
      storing the at least one library module at a first address in the memory;
      copying the at least one library module stored at the first address to a second address in the memory that is different than the first address;
      modifying the at least one library module stored at the first address into a stub library module;
      causing a first procedure call for a procedure in the at least one library module to reference the second address of the at least one library module; and
      causing a second procedure call for a procedure in the at least one library module to reference the first address of the at least one library module, the second procedure call originating from malicious code that is injected into the computing process after loading of a binary image, from which the computing process is created, into memory is complete.

2. The method of claim 1, wherein determining that at least one library module of the computing process is to be loaded into memory comprises:
   intercepting a procedure call initiated by the process loader to determine that at least one library module of the computing process is to be loaded into memory, the procedure call identifying the at least one library module of the computing process that is to be loaded.

3. The method of claim 1, wherein
   the first procedure call is included in at least one of the binary image and one or more other library modules imported for the computing process.

4. The method of claim 1, wherein said causing a first procedure call for a procedure in the at least one library module to reference the second address of the at least one library module comprises:

updating a data structure that stores an address at which the at least one library module is loaded into the memory with the second address of the at least one library module, thereby causing the first procedure call to reference the second address of the at least one library module.

5. The method of claim 4, wherein the data structure is an import address table.

6. The method of claim 5, further comprising:
randomizing at least one of the following:
a location at which the import address table is loaded into the memory;
one or more procedure names stored in the import address table; and
one or more indices within the import address table that correspond to the one or more procedure names.

7. The method of claim 1, wherein modifying the library module stored at the first address into a stub library module comprises:
causing one or more executable portions of the library module stored at the first address to be designated as non-accessible.

8. The method of claim 7, further comprising:
detecting an exception thrown by the operating system, the exception being thrown as a result of malicious code attempting to access the library module stored at the first address; and
determining that a malicious attack has occurred in response to detecting the exception.

9. The method of claim 1, further comprising:
randomizing the second address.

10. The method of claim 1, further comprising:
randomizing at least one of the following:
a location at which an export address table is loaded into the memory, the export address table including one or more addresses of one or more procedures that are exportable by the computing process;
one or more procedure names stored in the export address table; and
one or more indices within the export address table that correspond to the one or more procedure names.

11. The method of claim 1, further comprising:
randomizing at least one of one or more elements of a first data structure used by the operating system to manage the computing process and one or more elements of a second data structure used by the operating system to manage one or more threads associated with the computing process.

12. The method of claim 11, wherein the first data structure is a process environment block and the second data structure is a thread environment block.

13. The method of claim 1, further comprising:
randomizing one or more elements of one or more resource tables including resource information for the computing process.

14. A system, comprising:
one or more processing units; and
a memory coupled to the one or more processing units, the memory storing software modules for execution by the one or more processing units, the software modules comprising:

a runtime protector configured to:
load a library module for the computing process at a first address in the memory;
copy the library module stored at the first address to a second address in the memory that is different than the first address, wherein code that accesses the library module stored at the second address is designated as being non-malicious code;
modify the library module stored at the first address into a stub library module, wherein code attempting to access the library module stored at the first address is designated as being malicious code;
cause a first procedure call for a procedure in the library module to reference the second address of the at least one library module; and
cause a second procedure call for a procedure in the library module to reference the first address of the library module, the second procedure call originating from malicious code that is injected into the computing process after loading of a binary image, from which the computing process is created, into memory is complete.

15. The system of claim 14, wherein the runtime protector is further configured to:
update an import address table that stores one or more addresses at which one or more library modules are loaded into the memory with the second address of the library module, thereby causing code originating from the binary image to access the library module at the second address instead of the first address.

16. The system of claim 14, wherein the runtime protector is further configured to:
cause one or more executable portions of the library module stored at the first address to be designated as non-accessible.

17. The system of claim 16, the software modules further comprising:
an exception handler configured to detect an exception thrown by an operating system, the exception being thrown as a result of malicious code attempting to access the library module stored at the first address, the runtime protector further configured to:
determine that a malicious attack has occurred in response to a determination that the exception handler has detected the exception.

18. The system of claim 17, wherein the runtime protector is further configured to:
randomize a location at which the exception handler is loaded into the memory.

19. The system of claim 14, wherein the runtime protector is further configured to:
randomize the second address.

20. A computer-readable storage medium having program instructions recorded thereon that, when executed by a processing device, perform a method for modifying a computing process, the method comprising:
loading a library module for the computing process at a first address in the memory;
copying the library module stored at the first address to a second, randomized address in the memory that is different than the first address, wherein code that accesses the library module stored at the second address is designated as being non-malicious code;
modifying the library module stored at the first address into a stub library module, wherein code attempting to access the library module stored at the first address is designated as being malicious code;

causing a first procedure call for a procedure in the library module to reference the second address of the at least one library module; and causing a second procedure call for a procedure in the library module to reference the first address of the library module, the second procedure call originating from malicious code that is injected into the computing process after loading of a binary image, from which the computing process is created, into memory is complete.

* * * * *